United States Patent Office 3,634,276
Patented Jan. 11, 1972

3,634,276
LIQUID HARDENER FOR PHENOL ALDEHYDE RESINS
Roland E. Kreibich, Harlan G. Freeman, and Gene F. Baxter, Seattle, Wash., and Karl F. Kumli, Chico, Calif., assignors to Weyerhaeuser Company, Tacoma, Wash.
No Drawing. Application Oct. 11, 1968, Ser. No. 812,491, now Patent No. 3,492,263, dated Jan. 27, 1970, which is a division of application Ser. No. 528,772, Feb. 25, 1966, now Patent No. 3,422,068, dated Jan. 14, 1969. Divided and this application Jan. 7, 1970, Ser. No. 6,002
Int. Cl. C08g 51/74; C09j 3/16
U.S. Cl. 252—182    4 Claims

ABSTRACT OF THE DISCLOSURE

Disclosed are a liquid hardener for converting a phenol aldehyde resin into an adhesive, and a method for its manufacture. Use of this hardener avoids problems associated with the use of known powdered hardeners, such as caking or lumping under humid conditions, and the long and complicated mixing procedure required to blend powdered hardener with liquid resin. The liquid hardener is prepared by combining water, alcohol, formaldehyde solution, filler, protective colloid, pyrogenic silica and wetting agent in appropriate proportions.

---

This application is a division of application Ser. No. 812,491, filed Oct. 11, 1968 now Pat. No. 3,492,263, which application is itself a division of application Ser. No. 528,772, filled Feb. 25, 1966, and now issued as U.S. Pat. No. 3,422,068.

This invention relates to the production of a liquid hardener for use in the production of a phenolaldehyde aromatic adhesive.

In the manufacture of laminated wood products, it is the usual practice to spread an adhesive between at least two wooden laminates and then press them together at either ambient or elevated temperatures.

In recent years the forest product industry has developed highly sophisticated machinery for rapidly moving laminates together with adhesive therebetween for bonding. However, in order to effectively bond the laminates together, it is required that they remain in the press a predetermined period of time. Therefore, the rate of production is dependent on the length of time the laminates need to be in the press.

The adhesives used in these systems are usually formed from a phenol formaldehyde resin having conventional additives mixed therewith. The phenol and formaldehyde are combined by cooking a predetermined amount of each component together in the presence of an alkaline catalyst. The end product is a resin polymer that will cure to a hard infusible state when subjected to heat. While these resins form a good bond between a pair of laminates, they generally require long press times at high temperatures.

In order to reduce the long press time when using a phenol formaldehyde resin, it has been proposed to modify this resin with a resorcinol-aldehyde reaction product. However, in practice it has been found that press times are not appreciably reduced by this type of resin.

Also, it has been proposed to add resorcinol to the combined phenol formaldehyde polymer to shorten press time for complete cure. However, this expedient seriously reduces the pot life of the resin product which requires immediate use of the resin; but, most production lines require storage of the resin to ensure an adequate supply. Thus, this type of resin has been proven to be unsatisfactory.

The object of this invention is to provide a method of producing a phenol aldehyde resin modified with a polyhydroxy aromatic compound that has a relatively long shelf life and a relatively short cure time at ambient or moderately elevated temperatures.

Another object of this invention is to provide a resin produced by reacting an aldehyde with phenol in the presence of an ortho-directing catalyst and further modified with resorcinol to provide the resin with a relatively long shelf life and a relatively short cure time.

In the practice of the present invention, phenol and formaldehyde are mixed together in a cooking vessel of any desired size in the presence of an ortho-directing catalyst. A catalyst suitable for use with the present invention is a bivalent metal ion such as calcium, magnesium, zinc, strontium, cadmium, or barium. In use, the catalysts are usually bivalent metal salts of weak organic acids that are soluble in the phenol formaldehyde mixture. Typical are the acetate, citrate, glycolate, and tartrate salts.

During the initial cooking stage of formulating the resin, a particular amount of formaldehyde is used with the phenol. It has been found that a molecular ratio of from 0.55 to 1.2 moles of formaldehyde per mole of phenol is suitable. The pH of this reaction mass will be about 6. The phenol formaldehyde mass is cooked at reflux temperature in the presence of the bivalent metal catalyst until the reaction is near completion. By the term "near completion" it is meant that the viscosity of the reaction mass is about 125 centipoise at 25° C. with a solid content of up to 65%. The formaldehyde will attach predominantly at the ortho position to provide the following typical polymer:

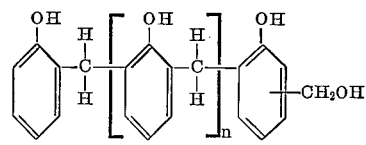

wherein $n$ is preferably a number greater than 1 and will depend on the molar ratio of the phenol and formaldehyde.

The temperature of the phenol formaldehyde reaction mass is now slightly reduced below reflux temperature and resorcinol is added.. The amount of resorcinol added may range from between 0.2 to 0.8 mole of resorcinol per mole of phenol. By adding the resorcinol to the reaction mass, the temperature thereof will be further reduced. This initial reduction of temperature will allow the intermixing of the resorcinol throughout the phenol formaldehyde reaction mass before substantial reaction takes place. The temperature of the phenol formaldehyde resorcinol mass is then raised back up to reflux temperature of approximately 96 to 98° C. After the phenol resorcinol formaldehyde mass has been reheated, an alkali metal hydroxide, water and an alcohol may be added. The function of the alcohol is to prevent phase separation of the resin during storage. The function of the alkali metal hydroxide is to stabilize, catalyze and wet and may be used in an amount ranging up to about 11% by weight.

The resorcinol phenol formaldehyde mass is then cooked until the viscosity is between 620 and 1300 centipoise. The time necessary to complete the cook is about 5 hrs. In order to increase the reaction rate between the phenol formaldehyde and resorcinol, the whole mass may be placed under pressure. This expedient will necessarily increase the reflux temperature and a faster reaction rate will occur. After the mass has reacted to the degree as set forth, the reaction mass is then cooled and shipped to the mill to be further processed and used. The resin mass to be shipped to the mill will have a storage life of about 30 days and will contain at least 50% solids. The resin product will have the following typical formula:

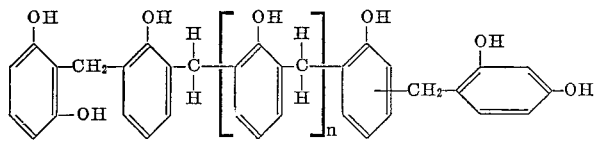

wherein $n$ is preferably a number greater than 1 and will depend on the molar ratio of the phenol and formaldehyde.

When it is desired to formulate a thermosetting adhesive from the above resin, it is required that a hardener be mixed therewith. It has been found in practice that commercial powdered hardeners consisting of a mixture of paraformaldehyde and fillers cannot be suitably employed with the resin of this invention. Such hardeners have the possibility of caking or lumping under humid conditions and require long and complicated mixing requirements to blend the lightweight powders with the liquid resin. Accordingly, a novel type liquid hardener was formulated.

The process for formulating the hardener is to mix 10 to 50 parts of water, up to 30 parts of an alcohol and 10 to 70 parts of formaldehyde solution in a vessel and stir continuously for a sufficient length of time to fully intermix these ingredients. Thereafter, a dry blend of between 15 and 40 parts filler and up to 2 parts hydroxyethyl cellulose is mixed in with the water, alcohol and formaldehyde. This mixture is blended until the dry ingredients are thoroughly intermixed therein. Then up to 5 parts of pyrogenic silica is added to the mixture and thoroughly mixed until a smooth paste is formed. Then up to 80 parts of formaldehyde solution is added to the mass along with up to 2 parts of a wetting agent and the whole mass is then thoroughly mixed. After the mass is thoroughly mixed, it is strained into a shipping container and stored. The mixture is thixotropic and does not readily settle out. After long periods of standing, a shallow, clear liquid layer may form on top but can be readily mixed in. The product is a thick, milky liquid.

As can be seen, the hardener consists of a liquid mixture of filler and aldehyde. Suitable fillers can be various clays, silica flour prepared from crystalline or amorphous silica, nutshell flours, chalk flour, powder asbestos and bark and wood flours. Of these, aluminum silicate clay, walnut shell flour, and crystalline silica flour have been found to have the most desirable properties. Combinations of these fillers may be used suitably. Of the aldehydes, it has been found that aqueous paraformaldehyde dispersions, various Formalin solutions, glyoxal and furfuraldehyde alone or in combinations are suitable. However, any aldehyde with enough activity to harden the phenol resorcinol polymer at room or intermediate temperature is suitable. The other ingredients serve as modifiers and stabilizers. Alcohol stabilizes Formalin solutions against precipitation and gelation. The pyrogenic silica helps prevent separation of the hardener dispersion and imparts thixotropy to the hardener and to the mixed glue. The hydroxyethyl cellulose and the wetting agent aid in dispersing the solid ingredient of the hardener and prevent separation. The hydroxyethyl cellulose also serves as a protective colloid for the dispersion.

The above hardener is mixed with the resin mass at a ratio of from 1 to 5 parts of resin per 1 part of hardener. After the hardener has been thoroughly mixed with the resin, the resin begins to react and now has a very short pot life. Accordingly, it is desirable that the resin and hardener be continuously mixed together and continuously applied to the wood to be bonded together. The continuous mixing and metering may be done by any commercial mixer capable of mixing two liquids together at a predetermined ratio.

The adhesive that is applied to the wood to be bonded together will have a viscosity of preferably between 600 and 8000 centipoise to provide the requisite spreadability properties thereof. The molecular ratio of the resorcinol to phenol will be between .2 to .8 mole of resorcinol per mole of phenol with the molecular ratio of formaldehyde to total phenolics of 0.70 to 2.0. The final adhesive product will have the following typical formula:

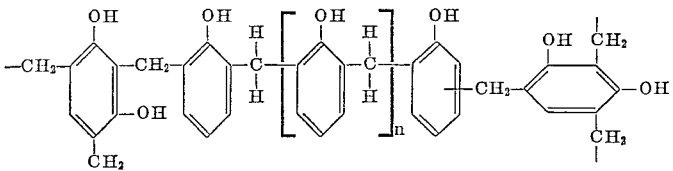

wherein $n$ is preferably a number greater than 1 and will depend on the molar ratio of the phenol and formaldehyde. It is apparent from this formula that methylene bridges have been formed, crosslinking the molecule to adjacent molecules, to provide the infusible final product.

As has been pointed out above, the resin will be at least 50% solids by weight. However, for some particular types of bonding procedures, it is not necessary to provide such a high solids content of the resin. Accordingly, the resin may be diluted by adding water thereto in a particular manner. The mere expedient of adding additional water will not result in a satisfactory resin.

Accordingly, when a resin is formulated having less solids therein, it is necessary to add water with the resorcinol when it is added to the reaction mass of the phenol and formaldehyde. The amount of water will be dictated in accordance with the amount of solids that are required in the final product. Ordinarily, sufficient water can be added to produce a resin having a final solids content of 35% based on the weight of the final resin. This resin can then be mixed with the hardener and formulated as set forth above for the final resin adhesive product. This resin will have the same molecular ratio and approximately the same viscosity as the resin noted above only with fewer solids based on the weight percent.

The above resin has found wide acceptance in the laminating industry because of the durability and cold setting nature of the resorcinol phenol formaldehyde resins. Particular acceptance has been found when laminating exterior beams. In other applications, the resorcinol phenol formaldehyde resins are advantageous because of their cold setting and rapid heat curing features and the durable nature of the resin after cure. The chief limitation, however, of these resins is their high cost due to the expense in obtaining resorcinol. Accordingly, the wood laminating companies and their suppliers have put forth a great deal of effort to try to replace the resorcinol portion of the resins.

In accordance with another feature of this invention, it has been found that a low cost polyhydric aromatic compound can be substituted for the resorcinol in the above resins. Tests show that such a substitution in conventional resin formulations results in a resin that is clearly unsatisfactory for most resin uses. These polyhydric aromatics are polyhydric, polynuclear aromatics and may also include one or more of the dihydroxy benzenes. The above materials may be prepared by reacting monochlorophenols with alkali metal hydroxides in accordance with Belgian Pat. No. 663,903 filed May 13, 1965, and issued to Dow Chemical Company of Midland, Mich. While the compositions per se above noted form no part of the present invention, it has been found that these materials may be substituted for the resorcinol content in the resin formulations as herein defined. Accordingly, for a complete disclosure of the process for formulating the above compositions and the description of the compositions per se, reference is made to the above-noted Belgian patent.

In order to illustrate the merits of the present invention, reference is made to the following examples:

EXAMPLE I

A resin was formulated by mixing together 45.48 parts by weight of 90% phenol (90% phenol and 10% water), 11.11 parts by weight 91% paraformaldehyde, 4.37 parts by weight water, and 0.44 part by weight calcium acetate in a cooking vessel which has heated to reflux temperature of 106° C. uniformly in 60 min. The temperature of the materials in the cooking vessel was held at the reflux temperature for 135 min. and then was slightly cooled. It was found that the phenol and formaldehyde had combined and had a viscosity of 125 centipoise at 25° C., a pH of 6, and an oven solids content of 60.1 parts by weight. Thereafter, 19.19 parts by weight resorcinol was added to the phenol formaldehyde reaction mass and heated back to reflux in 15 min. Then 6.55 parts by weight water, 9.59 parts by weight ethanol, and 3.27 parts by weight of a 50% solution of sodium hydroxide were added to the reaction vessel. The entire mass was then cooked at reflux temperature between 96 and 98° C. until the reaction mass reached a viscosity of between 880 and 1070 centipoise measured at 25° C. The mass was then cooled to room temperature and stored.

EXAMPLE II

A second resin formulation was made by placing in a cooking vessel 28.89 parts by weight 90% phenol (90% phenol and 10% water), 7.57 parts by weight 91% paraformaldehyde, 3.31 parts by weight water, and 0.28 parts by weight calcium acetate. The ingredients were heated to reflux at 106° C. uniformly in 60 min. The mass was held at the reflux temperature for an additional 135 min. and then slightly cooled. Then 12.39 parts by weight resorcinol was added to the phenol formaldehyde reaction mass and heated back to reflux in 15 min. Then 16.89 parts by weight water and 2.12 parts by weight of a 50% solution of sodium hydroxide was added. This mass was then cooked at reflux to a viscosity of 3620 centipoise measured at 25° C. Then 22.35 parts by weight water and 6.20 parts by weight ethylene glycol was added and cooked until the mass had a viscosity of 627 centipoise measured at 25° C. The resin was then cooled to room temperature and stored.

EXAMPLE III

A liquid hardener was formulated by placing in a vessel 32.40 parts by weight water, 3 parts by weight methanol, and 30.00 parts by weight of 46.5% formalin. This mixture of materials was stirred continuously. A dry blend of 25 parts by weight ASP–400 clay filler and .12 hydroxyethyl cellulose was prepared. This dry blend was added to the vessel and stirred in while 4.40 parts by weight Cab-O-Sil M5, pyrogenic silica, was added. A smooth paste was achieved. Then 5 parts by weight 46.5% formalin was added along with .10 part by weight Advawet 43, wetting agent. This mixture of materials was mixed thoroughly and then strained into a shipping container through a 30-mesh screen and stored. The viscosity of this material measured on a Brookfield viscometer with a No. 4 spindle was as follows: at 6 r.p.m., viscosity 10,000 centipoises; at 12 r.p.m., 6000 centipoises; at 30 r.p.m., 2940 centipoises.

EXAMPLE IV

The resin of Example I and liquid hardener of Example III were mixed together at a ratio of 5 parts of resin to 2 parts of hardener in a continuous manner and then applied to Douglas fir boards and laminated into beams. Tests were performed on the laminated beams using CS253–63 procedures with the following results:

TABLE I

| Clamp time, hours at 22° C. | Test results | | |
| --- | --- | --- | --- |
| | P.s.i. | Percent wood failure | Percent delamination |
| 7 | 1,180 | 100 | 0 |
| 8 | 1,160 | 87 | 0 |
| 9½ | 1,120 | 100 | 0 |
| 11 | 1,220 | 98 | 0 |

EXAMPLE V

A series of resins was made in accordance with the formulation as set out in Example I but varying the amount of resorcinol used with the amounts of the other constituents being held constant. Each of the resins was admixed with the liquid hardener of Example III at a ratio of 5 parts resin to 2 parts liquid hardener. Tests on this adhesive mix were as follows:

TABLE II

| Resin Number | 1161-44 | 1161-43 | 1115-101 | 1115-98 | 113L | 1161-45 | 1161-46 | 1161-47 | 1161-48 |
| --- | --- | --- | --- | --- | --- | --- | --- | --- | --- |
| Resorcinol:phenol molar ratio | 0.20 | 0.25 | 0.30 | 0.35 | 0.40 | 0.50 | 0.60 | 0.70 | 0.80 |
| 100° C. gel time,[1] min | 57 | 62 | 104 | 157 | 846 | 2,485 | 2,980 | 1,714 | 1,746 |
| Tests on adhesive mix [2]: | | | | | | | | | |
| Strength, p.s.i. | 1,003 | 1,103 | 841 | 1,127 | 1,220 | 1,162 | 1,051 | 1,163 | 1,300 |
| Percent wood failure | 78 | 47 | 100 | 95 | 98 | 87 | 87 | 100 | 38 |
| Percent delamination | 0 | 0 | 0 | 0 | 0 | 0 | 0 | 0 | 0 |

[1] The 100° C. gel time is a measure of storage life.
[2] 5 parts resin, 2 parts liquid hardener. Block shear values for 11 hrs. clamp time. The block shear results were determined by the AITC procedure and involved 70#/M ft.[3] spread and 10 min. open assembly time.

EXAMPLE VI

A conventional phenol formaldehyde resorcinol resin was formulated in a conventional manner employing sodium hydroxide as a catalyzing agent and the adhesive formulated therefrom in a well-known manner. Boards were laminated together with this adhesive as a comparative test with boards laminated together in accordance with the adhesive of Example IV. After seven hours clamp time under identical conditions, the beams laminated together with the resin of Example IV had a shear strength of 1180 p.s.i. while the beam laminated with the conventional resin had a shear strength of 729 p.s.i.

EXAMPLE VII

The resin of Example I was formulated but modified by substituting a mixture of polyhydric aromatic compounds for the resorcinol content on a weight basis. An adhesive was formulated from this resin by adding thereto a liquid hardener in accordance with Example III at a ratio of 5 parts resin to 2 parts hardener. The adhesive was placed on boards which were laminated together. A conventional phenol formaldehyde resorcinol resin was again formulated except a mixture of polyhydric aromatic materials was substituted for the resorcinol content. The conventional resin was formulated in the conventional manner using a sodium hydroxide catalyst. Block shear tests for the two resins were then performed using a 7 hour clamp time at 22° C. and 150 p.s.i. with the result that the resin of Example I, but modified by employing a mixture of polyhydric aromatic compounds for the resorcinol content, had a shear strength of 880 p.s.i. at 7 hours clamp time while the conventional catalyzed resin had a shear strength of 260 p.s.i.

From the above examples and tables, it is clear that the resin and adhesive of this invention exhibit bonding properties and shelf life in quantities far superior to those of a conventional phenol formaldehyde resorcinol resin.

While specific details of preferred embodiments have been set forth above, it will be apparent that many changes and modifications may be made therein without departing from the spirit of the invention. It will, therefore, be understood that what has been described herein is intended to be illustrative only, and is not intended to limit the scope of the invention.

What is claimed is:

1. A process for the manufacture of a liquid hardener, comprising the steps of: mixing 10 to 50 parts of water, up to 30 parts of alcohol, and 10 to 70 parts of formaldehyde solution in a vessel and stirring continuously to fully intermix the ingredients, blending a dry mix of from 15 to 40 parts of filler selected from the group consisting of clay, crystalline silica flour, amorphus silica flour, nutshell flours, chalk flours, powdered asbestos, bark flours, wood flours, and mixtures thereof and up to 2 parts of a protective colloid; blending the dry mix with the liquid ingredients; adding up to 5 parts of a pyrogenic silica and up to 80 parts of additional formaldehyde solution to the mass along with up to 2 parts by weight of a wetting agent and blending the mix thoroughly.

2. A process in accordance with claim 1 wherein said filler may be selected from the group consisting of aluminum silicate clay, walnut shell flour, crystalline silica flour and mixtures thereof.

3. The product prepared by the process of claim 1.

4. The product prepared by the process of claim 2.

References Cited

UNITED STATES PATENTS

| 3,210,309 | 10/1965 | Baker et al. | 260—38 |
| 3,216,966 | 11/1965 | Collins et al. | 260—38 |
| 3,328,354 | 6/1967 | Dietrick | 260—38 |
| 3,389,125 | 6/1968 | Dietrick et al. | 260—38 |

RICHARD D. LOVERING, Primary Examiner

I. GLUCK, Assistant Examiner

U.S. Cl. X.R.

260—17.2 R, 38, 47 R, 54